(12) United States Patent
Asayama et al.

(10) Patent No.: US 7,500,146 B2
(45) Date of Patent: Mar. 3, 2009

(54) INFORMATION PROCESSING APPARATUS, SELF-DIAGNOSIS METHOD, AND PROGRAM

(75) Inventors: Yoshinori Asayama, Mitaka (JP); Satomi Midorogi, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 534 days.

(21) Appl. No.: 11/263,624

(22) Filed: Oct. 31, 2005

(65) Prior Publication Data

US 2007/0055910 A1 Mar. 8, 2007

(30) Foreign Application Priority Data

Sep. 5, 2005 (JP) ............... 2005-256515

(51) Int. Cl.
*G06F 11/00* (2006.01)
(52) U.S. Cl. ............... 714/26; 714/48; 714/57
(58) Field of Classification Search ............... 714/26, 714/48, 57, 733; 345/619, 620
See application file for complete search history.

(56) References Cited

U.S. PATENT DOCUMENTS

| 5,119,489 | A | | 6/1992 | Bond et al. | |
|---|---|---|---|---|---|
| 5,649,094 | A | | 7/1997 | Hayashi et al. | |
| 5,673,028 | A | * | 9/1997 | Levy | 340/635 |
| 5,822,335 | A | * | 10/1998 | Dannenberg | 714/733 |
| 6,721,912 | B2 | * | 4/2004 | Burger et al. | 714/733 |
| 7,111,218 | B2 | * | 9/2006 | Egger et al. | 714/733 |
| 2005/0119808 | A1 | | 6/2005 | Suzuki | |

FOREIGN PATENT DOCUMENTS

| JP | 02-092135 A | 3/1990 |
|---|---|---|
| JP | 6-342040 A | 12/1994 |
| JP | 3080530 B2 | 8/2000 |
| JP | 3363015 B2 | 10/2002 |
| JP | 2004-093198 A | 3/2004 |
| TW | 200400513 A | 1/2004 |
| TW | 580682 | 3/2004 |
| TW | 580724 | 3/2004 |

OTHER PUBLICATIONS

Japanese Office Action dated Jun. 10, 2008 issued in counterpart Japanese Application No. 2004-278087.

* cited by examiner

*Primary Examiner*—Marc Duncan
(74) *Attorney, Agent, or Firm*—Frishauf, Holtz, Goodman & Chick, P.C.

(57) ABSTRACT

A screen on which a transition to a self-diagnosis test mode is reported is displayed by simultaneously pressing a plurality of specific keys (AC, Shift, and Menu), and moreover, a transition is made to a self-diagnosis test mode by inputting one of predetermined key signals ("1", "2", "3", and "•"), and a self-diagnosis test is executed. A test result is displayed in the middle of the screen, and a specific mark composed of a predetermined character string (such as ABCDE) is displayed at a position and in a size which correspond to a key signal input during a display of the reporting screen.

16 Claims, 14 Drawing Sheets

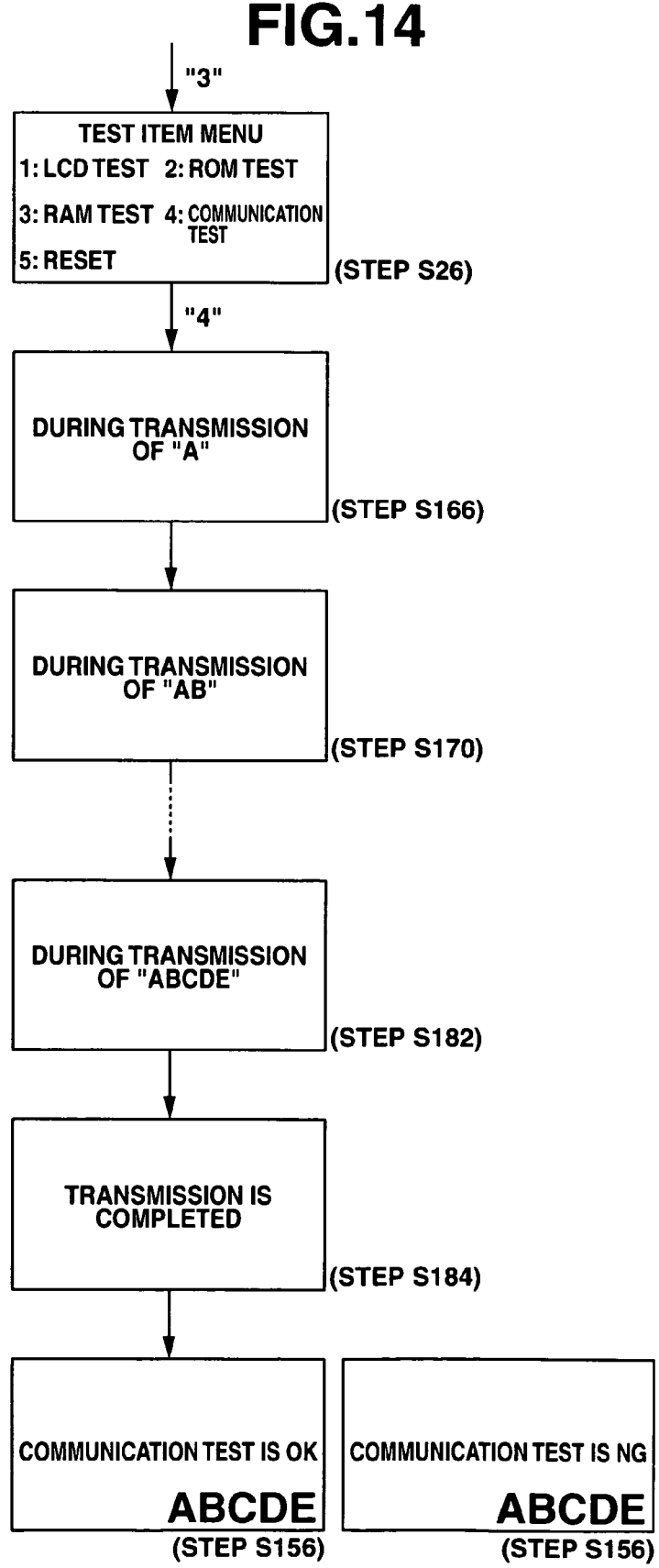

INFORMATION PROCESSING APPARATUS, SELF-DIAGNOSIS METHOD, AND PROGRAM

CROSS-REFERENCE TO RELATED APPLICATIONS

This application is based upon and claims the benefit of priority from prior Japanese Patent Application No. 2005-256515, filed Sep. 5, 2005, the entire contents of which are incorporated herein by reference.

BACKGROUND OF THE INVENTION

1. Field of the Invention

The present invention relates to an information processing apparatus having a self-diagnosis function, a self-diagnosis method, and a program thereof.

2. Description of the Related Art

As an example of compact and portable information processing apparatuses, a scientific electronic calculator (electronic desktop calculator) has been developed, in which, when various mathematical formulas are input, an operation is carried out on the basis of the input mathematical formulas, and an operation result is displayed. The scientific electronic calculator has various types of built-in complex semiconductor circuits in order to carry out complicated operations. Further, generally, the scientific electronic calculator has a display device on which input numeric values, arithmetic expressions, operation results, and the like are displayed.

On the other hand, an apparatus for testing whether or not a semiconductor circuit functions correctly has been known (for example, Japanese Patent Application KOKAI Publication No. 6-342040). By providing this apparatus to a scientific electronic calculator, for example, a function of testing whether a semiconductor circuit incorporated in the electronic calculator is normal or abnormal (hereinafter, called a self-diagnosis function) can be installed therein.

Here, in a process of manufacturing a scientific electronic calculator or the like, a tester generally carries out a final inspection of a product. For example, a method has been used in which a self-diagnosis test program stored in an electronic calculator is executed, and it is determined whether is good or bad of each single of products by viewing the test results.

Here, many screens on which a result of a self-diagnosis test is displayed are monotone display screens. It is necessary for a tester who checks a great number of products in a factory or the like to carry out inspections with a constant sense of tension in order to not miss monotone screens on which the results have been displayed, which forces the tester to bear the great burden.

As described above, in the conventional self-diagnosis test function, there is a disadvantage that the visibility of indicating a test result is low.

BRIEF SUMMARY OF THE INVENTION

An object of the embodiment of the present invention is to provide an information processing apparatus having a self-diagnosis test function with a high visibility of indicating a test result, a self-diagnosis method, and a program thereof.

According to an embodiment of the present invention, a self-diagnosis method in an information processing apparatus having a self-diagnosis test function, the method comprises:

a test mode setting step of setting an operation mode to a test mode in response to one of first input key signals;

a test executing step of executing a self-diagnosis test in the test mode set by the test mode setting step; and a result display step of displaying a result of the self-diagnosis test executed by the test executing step at a predetermined position on a display screen, and of displaying a specific mark in a mode corresponding to the one of the first input key signals.

According to another embodiment of the present invention, a computer program product configured to store program instructions for execution on a computer system of an information processing apparatus having a self-diagnosis test function enables the computer system to perform:

setting an operation mode to a test mode in response to any first input key signal;

executing a self-diagnosis test in the test mode;

displaying a result of the self-diagnosis test at a predetermined position on a display screen; and displaying a specific mark in a mode corresponding to the any first input key signal.

According to another embodiment of the present invention, an information processing apparatus having a self-diagnosis test function, the information processing apparatus comprises:

test mode setting means for setting an operation mode to a test mode in response to one of first input key signals;

test executing means for executing a self-diagnosis test in the test mode set by the test mode setting means; and result display means for displaying a result of the self-diagnosis test executed by the test executing means at a predetermined position on a display screen, and for displaying a specific mark in a mode corresponding to the one of the first input key signals.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 14 is a diagram showing a screen transition of the display unit at the time of the communication test.

DETAILED DESCRIPTION OF THE INVENTION

An embodiment of an information processing apparatus and a self-diagnosis method according to the present invention will now be described with reference to the accompanying drawings.

Figure 1:
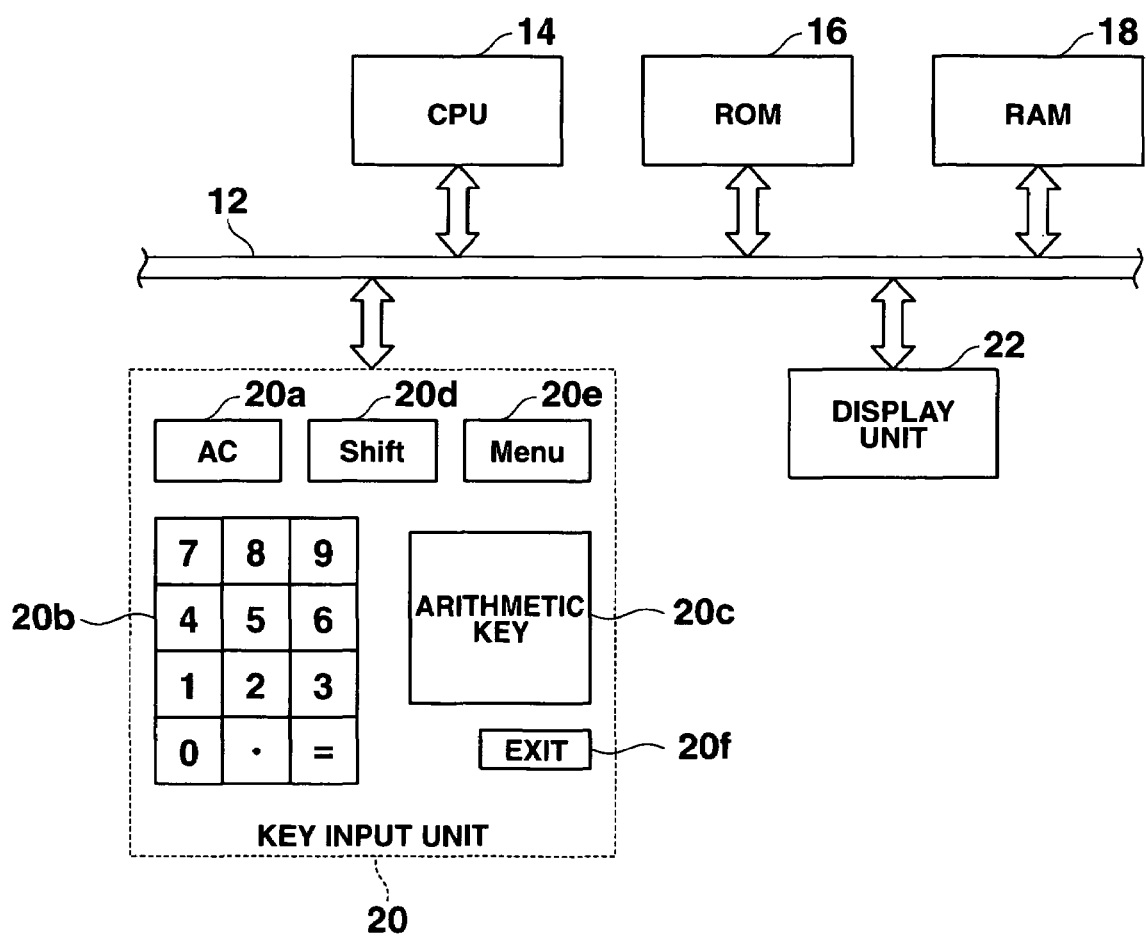
FIG. 1 is a block diagram showing a configuration of a scientific electronic calculator according to an embodiment of a portable information processing apparatus of the present invention.

FIG. 1 is a block diagram showing a configuration of a scientific electronic calculator serving as a portable information processing apparatus according to a first embodiment of the present invention. The scientific electronic calculator has, in addition to a usual operation mode, a self-diagnosis test mode for testing whether or not various functions work correctly.

A CPU 14, a ROM 16, a RAM 18, a key input unit 20, and a display unit 22 are connected to a system bus 12. The key input unit 20 is an input device having a key group, such as numeric keys and an arithmetic key, which are necessary for inputting mathematical formulas, selecting functions, and the like, and outputs a key signal to the CPU 14 upon depression of a key. Input means such as an input of a mathematical formula, instructions to select a function or to carry out an operation are realized by a key input by the key input unit 20. The key input unit 20 is composed of an AC key 20*a* for turning a power source on, a ten key 20*b* including "0" to "9", "•", and "=" keys, an arithmetic key 20*c* for functional operations, a shift key 20*d*, a menu key 20*e*, and an EXIT key 20*f*.

The ten key 20*b* comprises keys for inputting numeric values to the scientific electronic calculator, and the arithmetic key 20*c* is a key for inputting operators in cases of carrying out arithmetical operations and functional operations.

Functional operations can be input by not only an input of the arithmetic key 20*c* (single or a combination with the shift key 20*d*), but also a designation from a menu screen. As a consequence, a great variety of functional operations are made possible.

The menu key 20*e* is a key for accessing to a menu for executing respective calculating functions in the scientific electronic calculator, and the shift key 20*d* is a key for used in combination with other keys to be pressed down. For example, when the AC key 20*a* is pressed down, the power source of the scientific electronic calculator is made to be in an on-state, and the power source of the scientific electronic calculator is made to be in an off-state by pushing down the shift key 20*d* and the AC key 20*a* in combination.

The display unit 22 is a device at which various data, mathematical formulas, operation results, and the like which are necessary for using the scientific electronic calculator, such as mathematical formulas and characters corresponding to various keys being pressed down, are displayed, and includes a dot-matrix system liquid crystal display (LCD). However, the display unit 22 may be a segment system liquid crystal display device or the like.

Figure 2A:
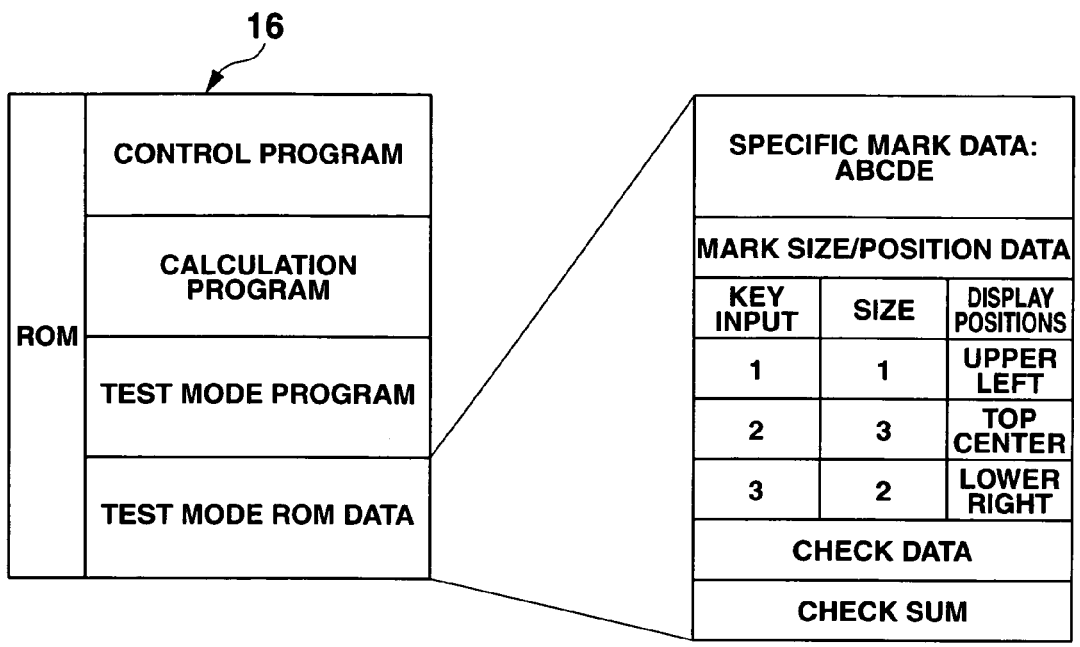
FIG. 2A is a diagram showing a configuration of a data structure to be stored in a ROM of FIG. 1.

The ROM 16 includes, as shown in FIG. 2A, a control program, a calculation program, a test mode program, and test mode ROM data. The test mode program is a test program executed in a test mode. The test mode ROM data is for storing a variety of data used at the time of a self-diagnosis test, and is composed of specific mark data, mark size/position data, check data, check sum, and the like. The specific mark is to be displayed along with a diagnosed result in order to improve the visibility of test results after a self-diagnosis test is completed, and in this embodiment, for example, ABCDE is registered as a specific mark. The mark size/position data is to designate a size and a display position of the specific mark, and three types of combinations are preset. The types are designated by a key input for designating a transition to the self-diagnosis test mode (here, any one of "1", "2", and "3"). The check data is data for calculating a check sum for a test of the ROM (check sum test). The check sum is a correct check sum for checking a check sum test.

The display position shows a position on the display unit 22 at which a specific mark is displayed. Practically, a position is specified by utilizing coordinates on the display unit (for example, on the fifth dot in a transverse direction, and on the third dot in a longitudinal direction). However, in the present embodiment, a position is expressed as a relative position such as the upper left, the lower right, the top center, or the like in the display unit in order to simplify the description.

The size expresses a size of the specific mark, and here, relatively expresses what multiple times of a standard size in cases where the scientific electronic calculator displays numeric values and mathematical formulas. Note that, in addition thereto, the method of specifying a size, for example, may be a method of specifying a point of a character.

Figure 2B:
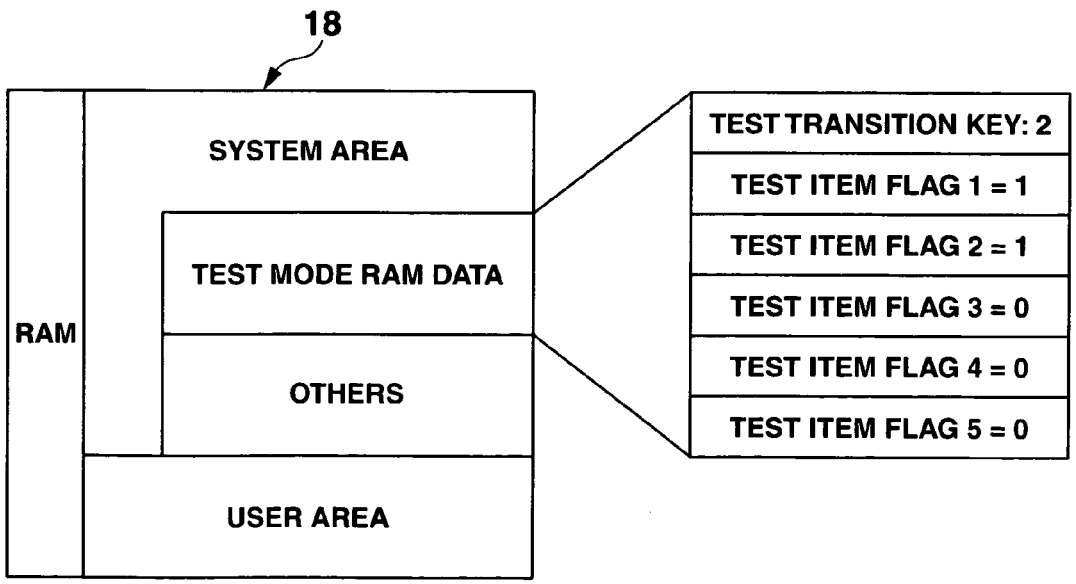
FIG. 2B is a diagram showing a configuration of a data structure to be stored in a RAM of FIG. 1.

The RAM 18 is a memory into which various programs executed by the CPU 14, data relating to the executions of these programs, and the like are temporarily stored, and which is programmable at any time. The RAM 18 includes a system area and a user area as shown in FIG. 2B, and the system area stores test mode RAM data and other data. The test mode RAM data includes a test transition key, and a test item flag 1 to a test item flag 5. The test transition key is to store a key for instructing to make a transition to a self-diagnosis mode (a key for specifying the above-described mark size/position). The test item flags 1 to 5 show test results in the respective items, and "0" are set therein as initial values. After a test is completed, "1" is set in an item when the result is normal (OK), and "2" is set in an item when the result is abnormal (NG).

Figure 3:
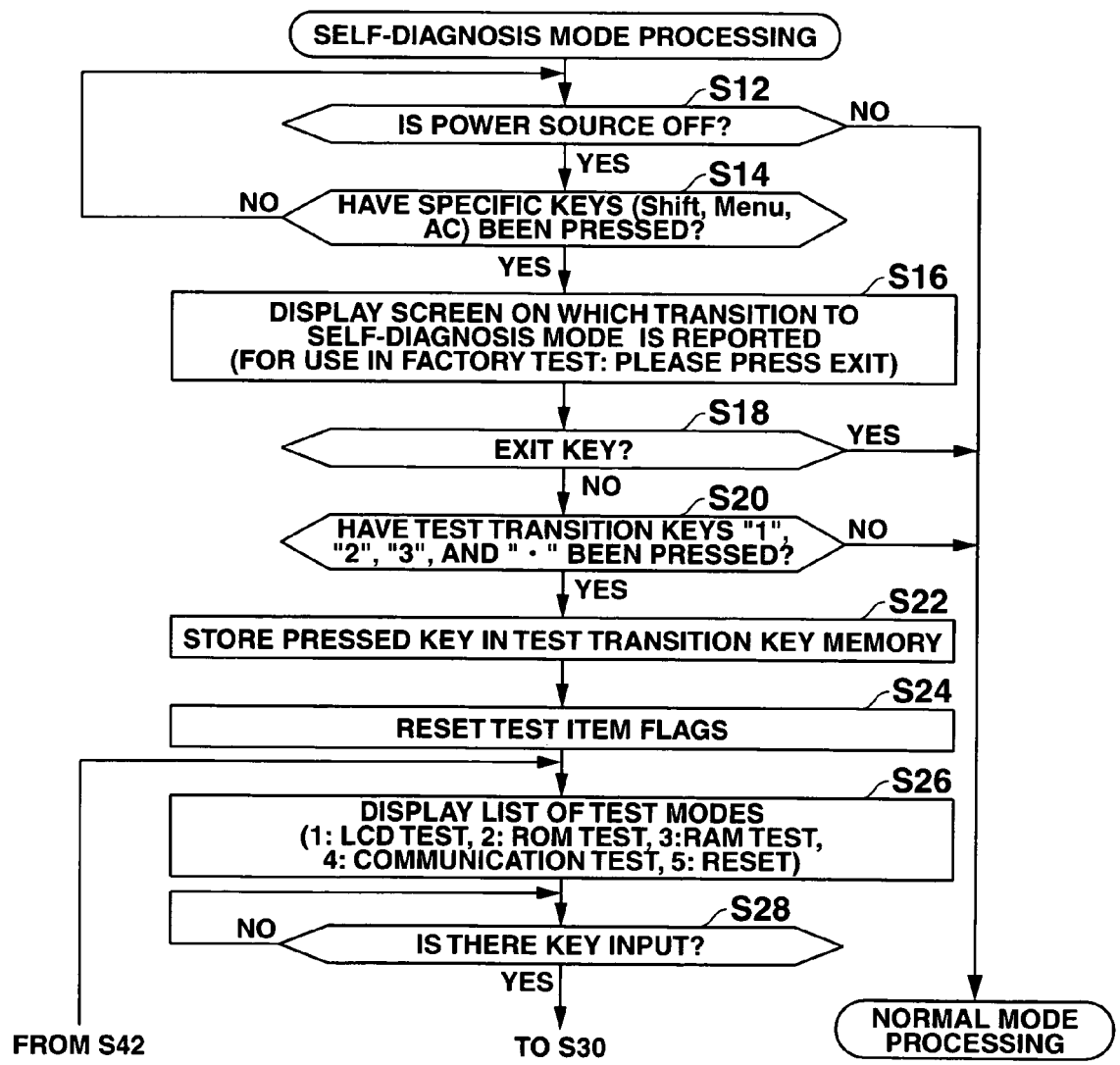
FIG. 3 is a flowchart showing a self-diagnosis test mode processing of the scientific electronic calculator.
Figure 4:
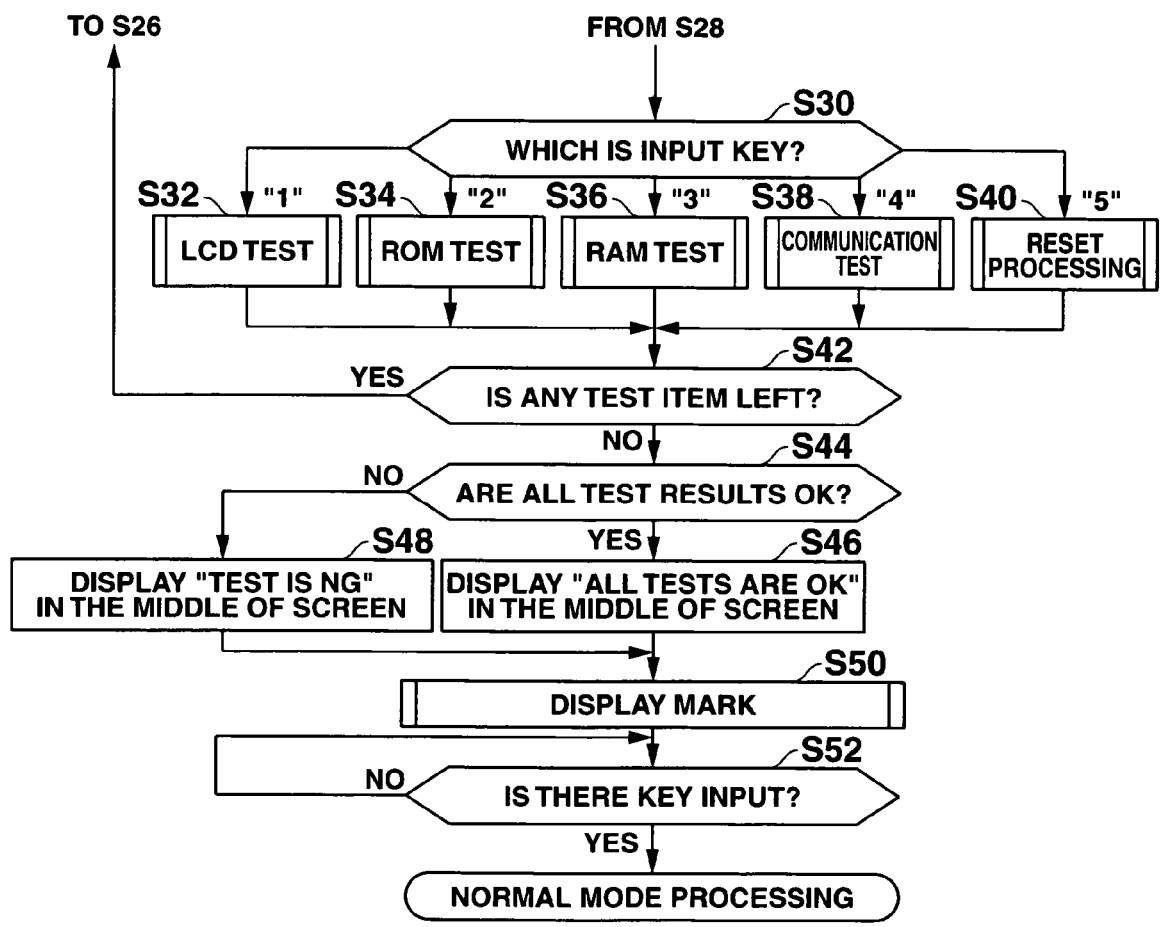
FIG. 4 is a flowchart showing the self-diagnosis test mode processing which follows FIG. 3.

FIGS. 3 and 4 are flowcharts of a self-diagnosis test mode processing. In the present embodiment, not only a normal mode, but also a self-diagnosis test mode is provided. The normal mode is started when the power source is turned on by the AC key 20*a*. The self-diagnosis test mode is started by simultaneously pressing at least three keys including the AC key 20*a* during the time the power source is off, i.e., the AC key 20*a*, the shift key 20*d*, and the menu key 20*e* in this embodiment. Note that the self-diagnosis test mode is used before shipment in a factory, and has no relation to general users. Therefore, keys for starting the self-diagnosis test mode are not informed to users.

It is determined in step S12 whether or not the power source is turned off. Note that a key scan is carried out even during the time the power source is off. In a case where the power source is off, it is determined in step S14 whether or not the three specific keys: the AC key 20*a*, the shift key 20*d*, and the menu key 20*e* are simultaneously pressed. When it is not determined that the three specific keys are simultaneously pressed, the process returns to step S12. When the power source is turned on, the processing in a normal mode is carried out.

When it is determined in step S14 that the three specific keys are simultaneously pressed, a screen on which a transition to the self-diagnosis test mode is reported is displayed in step S16. This is for a general user who has simultaneously pressed the AC key 20a, the shift key 20d, and the menu key 20e in error during the time the power source is off, "A self-diagnosis test mode is for used in a factory. Please press the EXIT key (return to a normal mode)" is displayed. Thereafter, it is determined in step S18 whether or not the EXIT key 20f has been pressed, and when it is determined that the EXIT key 20f has been pressed, the processing in the normal mode is carried out.

In a factory, it is necessary to make a transition to the self-diagnosis test mode actually, and it is necessary to press a predetermined test transition key other than the EXIT key 20f during a display of the self-diagnosis test mode transition reporting screen. As described above, the test transition keys serve as a function of designating forms (a size, a position) of a display of the specific mark, and "1", "2", "3", and "•" are determined in advance as the transition keys. Note that the transition key "•" is pressed in a case where, although a transition is made to the self-diagnosis test mode, an attempt is made to omit a display of the specific mark after a self-diagnosis test is completed. It is determined in step S20 whether or not any one of these test transition keys has been pressed. When any of these test transition keys has not been pressed, the processing in the normal mode is carried out.

When any one of these test transition keys has been pressed, the processing in the self-diagnosis test mode is actually started. A signal of the test transition key is stored in the test transition key memory of the RAM 18 in step S22. The test item flags 1 to 5 of the RAM 18 are reset ("0" are set) in step S24. A list of the test items is displayed in step S26. There are five test items: an LCD test, a ROM test, a RAM test, a communication test, and reset, and numerals 1 to 5 are allocated to the respective items, so that the test items can be selected by inputting the numerals.

It is determined in step S28 whether or not a key for selecting a test item has been pressed. Step S28 is repeated until a key input is detected, and when a key input is detected, the key is identified in step S30. When the "1" key has been pressed, an LCD test is executed in step S32; when the "2" key has been pressed, a ROM test is executed in step S34; when the "3" key has been pressed, a RAM test is executed in step S36; when the "4" key has been pressed, a communication test is executed in step S38; and when the "5" key has been pressed, reset processing is executed in step S40. The details of the respective tests (reset processing is included in the tests) will be described later.

It is determined in step S42 whether or not all the tests have been executed. Because the initial values in the test item flags 1 to 5 are "0", it can be determined that all the tests have been executed if all the test item flags 1 to 5 are values other than "0". When even one of the test item flags is "0", the process returns to step S26, and a selection of a test item is repeated. It is determine in step S44 whether or not all the test results are normal. As will be described later, because values corresponding to the test results are set as the test item flags when the tests are completed, the test results can be determined according to the values of the flags.

When all the test results are normal, "All tests are OK" is displayed in the middle of the screen in step S46. When even one test result is abnormal, "Tests are NG" is displayed in the middle of the screen in step S48. Thereafter, the specific mark as well is displayed in step S50. The details thereof will be described later.

It is determined in step S52 whether or not any key is operated. When a key input is detected, a transition is made to the processing in the normal mode.

Figure 5:
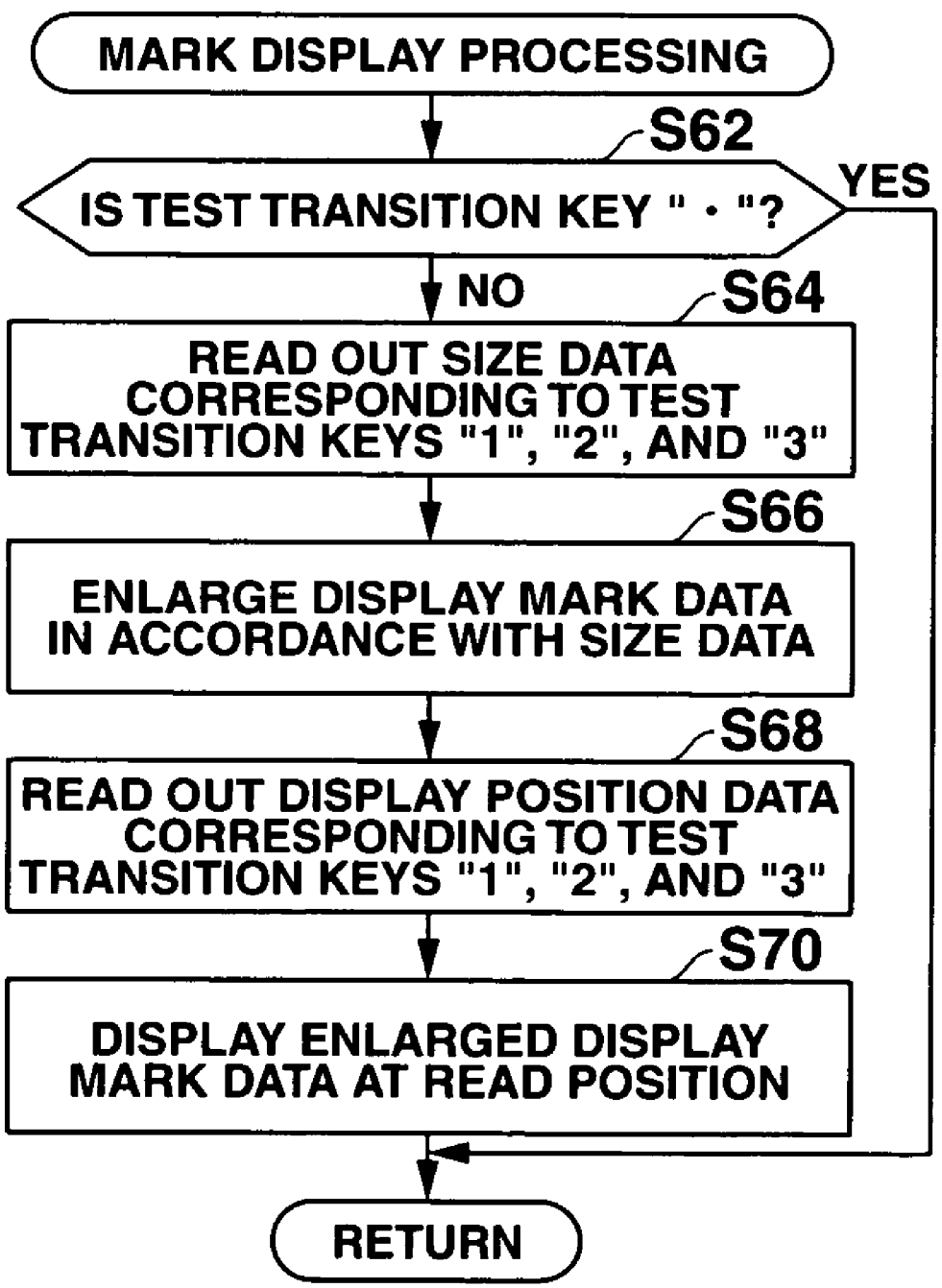
FIG. 5 is a flowchart showing mark display processing in the self-diagnosis test mode processing.

FIG. 5 is a detailed flowchart of mark display processing which is executed in step S50 of FIG. 4. In step S62, it is determined whether or not the test transition key is "•" with reference to the test transition key memory of the RAM 18. When the test transition key is "•", the process is terminated without mark display processing being executed.

When the test transition key is not "•", mark size data corresponding to the test transition keys "1", "2", and "3" are read from the test mode ROM data area of the ROM 16 in step S64, and the specific mark is enlarged in step S66 so as to correspond to the size data. For example, when the test transition key is "1", there is no enlargement processing; when the test transition key is "2", the specific mark is enlarged threefold; and when the test transition key is "3", the specific mark is enlarged double.

In step S68, mark position data corresponding to the test transition keys "1", "2", and "3" are read from the test mode ROM data area of the ROM 16, and in step S70, the specific mark after enlargement processing is displayed at the display position. For example, when the test transition key is "1", the specific mark without being enlarged is displayed in the upper left; when the test transition key is "2", the specific mark with being enlarged threefold is displayed in the top center; and when the test transition key is "3", the specific mark with being enlarged double is displayed in the lower right.

Figure 6:
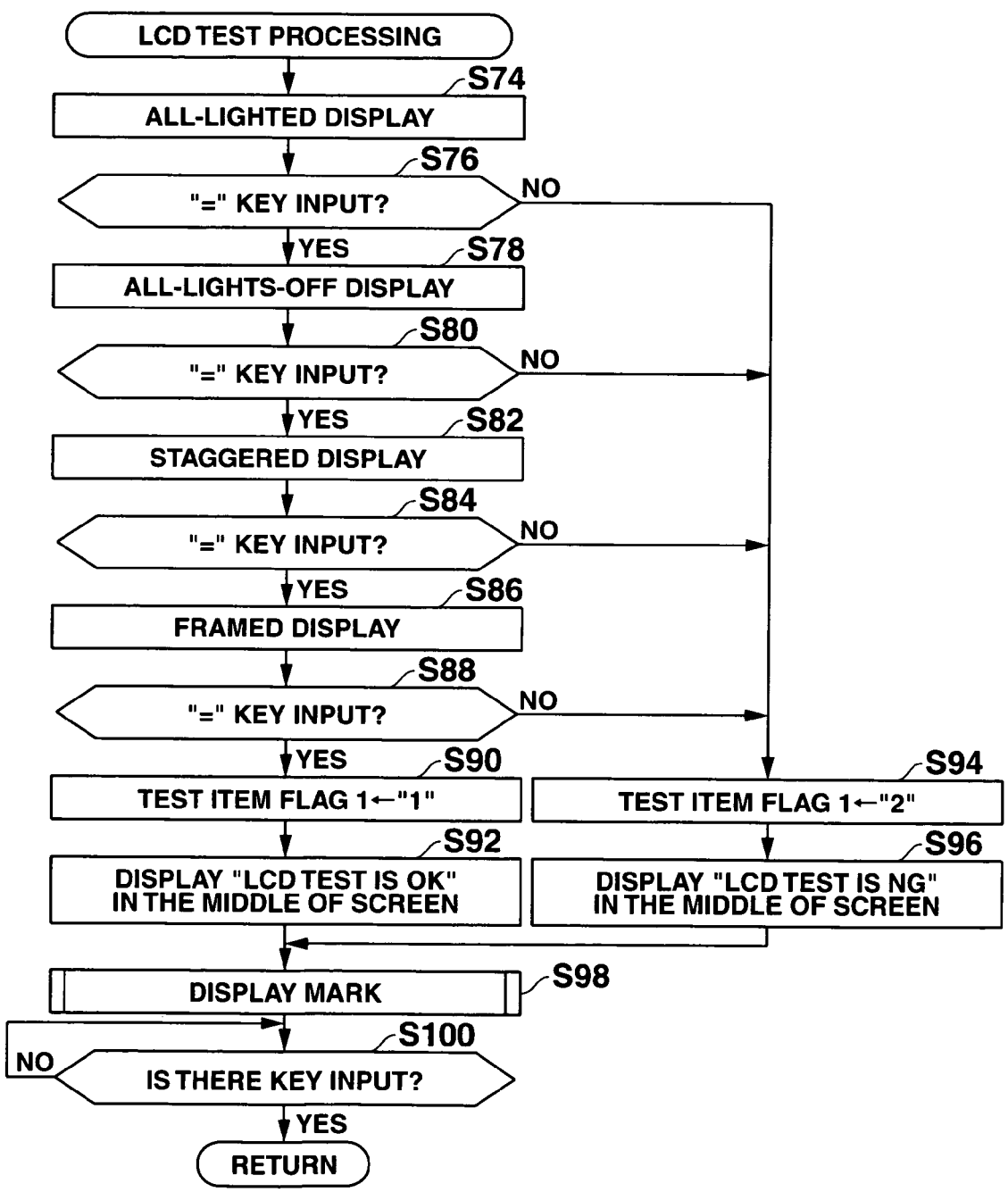
FIG. 6 is a flowchart showing LCD test processing in the self-diagnosis test mode processing.

FIG. 6 is a detailed flowchart of the LCD test processing which is executed in step S32 of FIG. 4. All the pixels of the LCD are lighted in step S74. An LCD test is to determine whether or not the LCD is correctly lighted with eyes of a test person. When the LCD is correctly lighted, the "=" key is pressed, and when the LCD is incorrectly lighted, a key other than the "=" key is pressed. It is determined in step S76 whether or not the "=" key has been pressed. When a key other than the "=" key has been pressed, "2" is set to the test item flag 1 in step S94, and "LCD test is NG" is displayed in the middle of the screen in step S96.

When it is determined in step S76 that the "=" key has been pressed, all the pixels of the LCD are turned off in step S78. It is determined in step S80 whether or not the "=" key has been pressed. When a key other than the "=" key has been pressed, "2" is set to the test item flag 1 in step S94, and "LCD test is NG" is displayed in the middle of the screen in step S96.

When it is determined in step S80 that the "=" key has been pressed, the pixels of the LCD are alternately lighted so as to be staggered in step S82. It is determined in step S84 whether or not the "=" key has been pressed. When a key other than the "=" key has been pressed, "2" is set to the test item flag 1 in step S94, and "LCD test is NG" is displayed in the middle of the screen in step S96.

When it is determined that the "=" key has been pressed in step S84, only peripheral pixels are lighted in a frame form in step S86. The peripheral pixels in a predetermined width (for example, of three dots) from the edge among the display dots of the display unit 22 are lighted, and the remaining part (central part) is not lighted. It is determined in step S88 whether or not the "=" key has been pressed. When a key other than the "=" key has been pressed, "2" is set to the test item flag 1 in step S94, and "LCD test is NG" is displayed in the middle of the screen in step S96.

When it is determined in step S88 that the "=" key has been pressed, "1" is set to the test item flag 1 in step S90, and "LCD test is OK" is displayed in the middle of the screen in step S92.

The mark display processing as shown in FIG. 5 is executed in step S98. When a transition is made to the self-diagnosis mode on the basis of a key input of any one of "1", "2", and "3", "ABCDE" serving as the specific mark is displayed at a position corresponding to the input key, and in a size corresponding to the input key. The display position of a test result is fixed to the middle of the screen. However, the display position of the specific mark is made variable according to a transition key.

It is determined in step S100 whether or not any key is operated. When a key input is detected, the LCD test is terminated.

Figure 7:
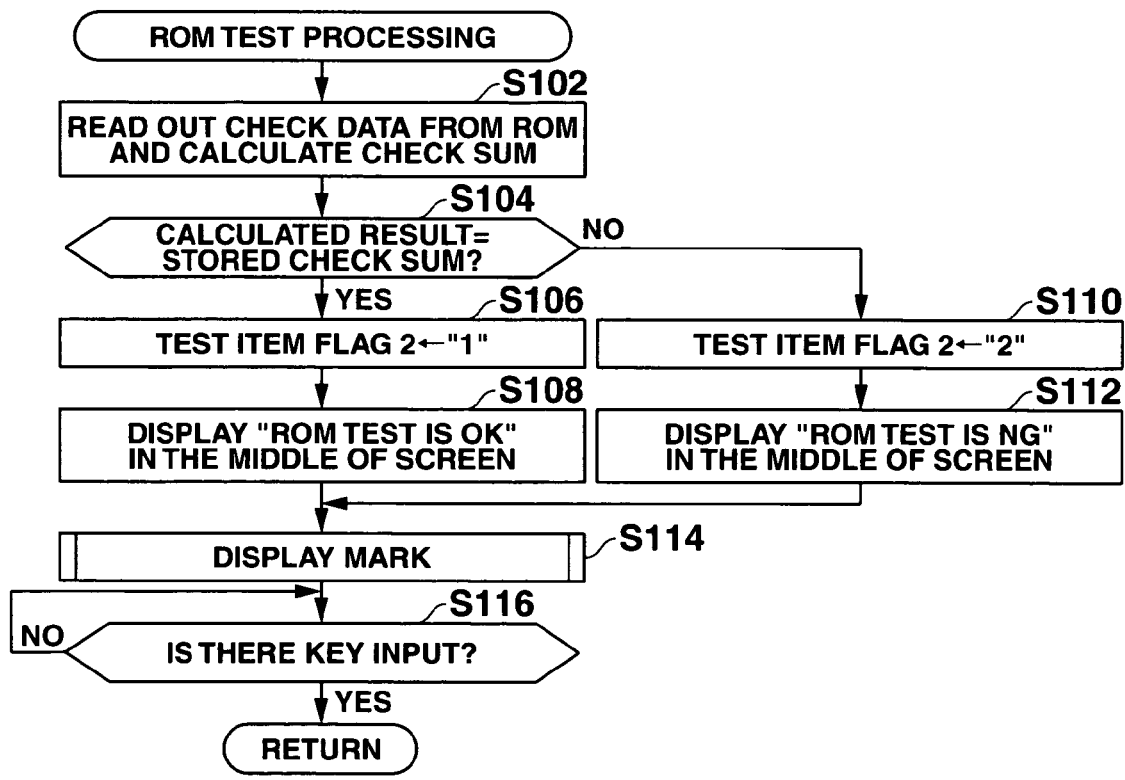
FIG. 7 is a flowchart showing ROM test processing in the self-diagnosis test mode processing.

FIG. 7 is a detailed flowchart of the ROM test processing which is executed in step S34 of FIG. 4. In step S102, the check data is read from the test mode ROM data area of the ROM 16, and check sum is calculated. In step S104, a result of the calculation and the check sum stored in the test mode ROM data area of the ROM 16 are compared.

When the both are the same, "1" is set to the test item flag 2 in step S106, and "ROM test is OK" is displayed in the middle of the screen in step S108. When the both are not the same, "2" is set to the test item flag 2 in step S110, and "ROM test is NG" is displayed in the middle of the screen in step S112.

The mark display processing as shown in FIG. 5 is executed in step S114. When a transition is made to the self-diagnosis mode on the basis of a key input of any one of "1", "2", and "3", "ABCDE" serving as the specific mark is displayed at a position corresponding to the input key, and in a size corresponding to the input key. The display position of a test result is fixed to the middle of the screen. However, the display position of the specific mark is made variable according to a transition key.

It is determined in step S116 whether or not any key is operated. When a key input is detected, the ROM test is terminated.

Figure 8:
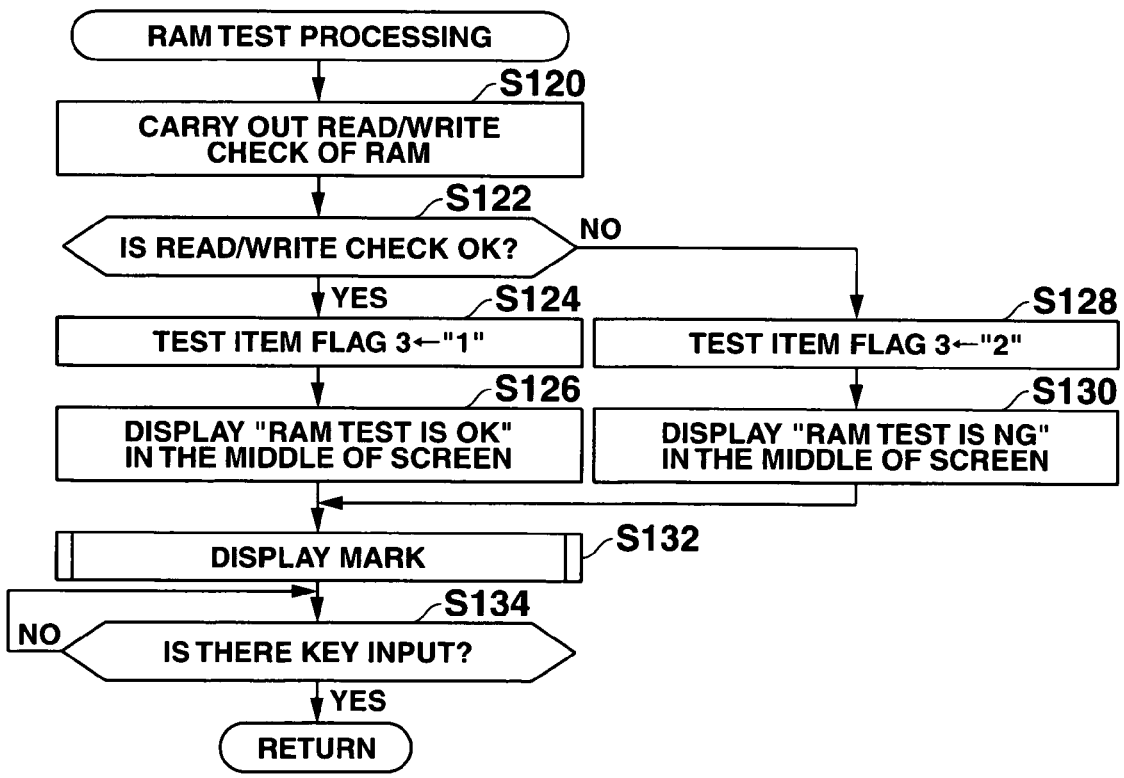
FIG. 8 is a flowchart showing RAM test processing in the self-diagnosis test mode processing.

FIG. 8 is a detailed flowchart of the RAM test processing which is executed in step S36 of FIG. 4. In step S120, a read/write check of the RAM 18 is carried out. In step S122, it is determined whether or not a result of the read/write check is normal.

When a result of the check is normal, "1" is set to the test item flag 3 in step S124, and "RAM test is OK" is displayed in the middle of the screen in step S126. When a result of the check is not normal, "2" is set to the test item flag 3 in step S128, and "RAM test is NG" is displayed in the middle of the screen in step S130.

The mark display processing as shown in FIG. 5 is executed in step S132. When a transition is made to the self-diagnosis mode on the basis of a key input of any one of "1", "2", and "3", "ABCDE" serving as the specific mark is displayed at a position corresponding to the input key, and in a size corresponding to the input key. Although the display position of a test result is fixed to the middle of the screen, the display position of the specific mark is made variable according to a transition key.

In step S134, it is determined whether or not any key is operated. When a key input is detected, the RAM test is terminated.

Figure 9:
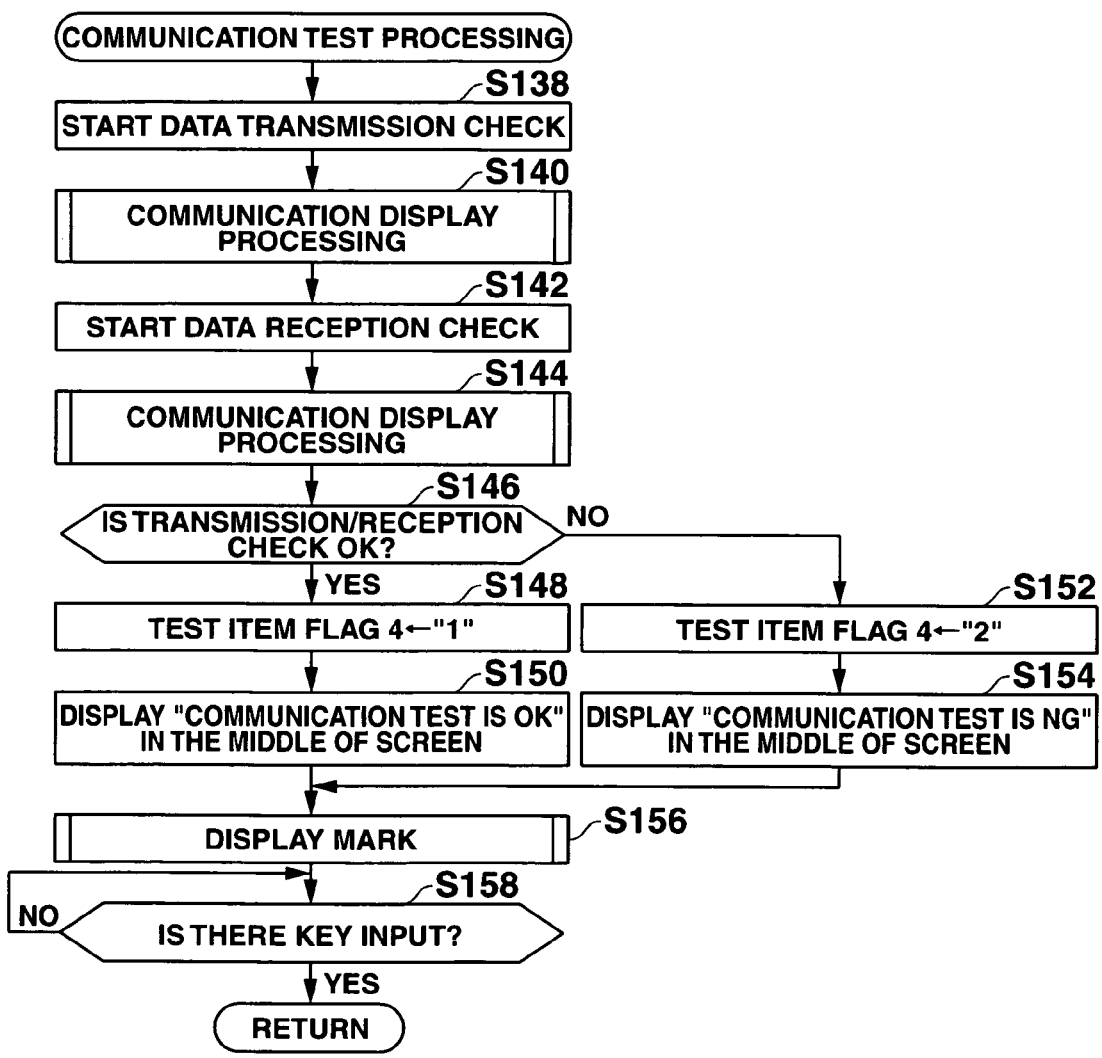
FIG. 9 is a flowchart showing communication test processing in the self-diagnosis test mode processing.

FIG. 9 is a detailed flowchart of the communication test processing which is executed in step S38 of FIG. 4. A check of data transmission is started in step S138. The communication display processing (whose details will be described later) is executed in step S140. A check of data reception is started in step S142. The communication display processing is executed in step S144.

In step S146, it is determined whether or not the results of the checks of transmission/reception are normal.

When the results of the checks are normal, "1" is set to the test item flag 4 in step S148, and "Communication test is OK" is displayed in the middle of the screen in step S150. When at least one of the check results is not normal, "2" is set to the test item flag 4 in step S152, and "Communication test is NG" is displayed in the middle of the screen in step S154.

The mark display processing as shown in FIG. 5 is executed in step S156. When a transition is made to the self-diagnosis mode on the basis of a key input of any one of "1", "2", and "3", "ABCDE" serving as the specific mark is displayed at a position corresponding to the input key, and in a size corresponding to the input key. Although the display position of a test result is fixed to the middle of the screen, the display position of the specific mark is made variable according to a transition key.

In step S158, it is determined whether or not any key is operated. When a key input is detected, the communication test is terminated.

Figure 10:
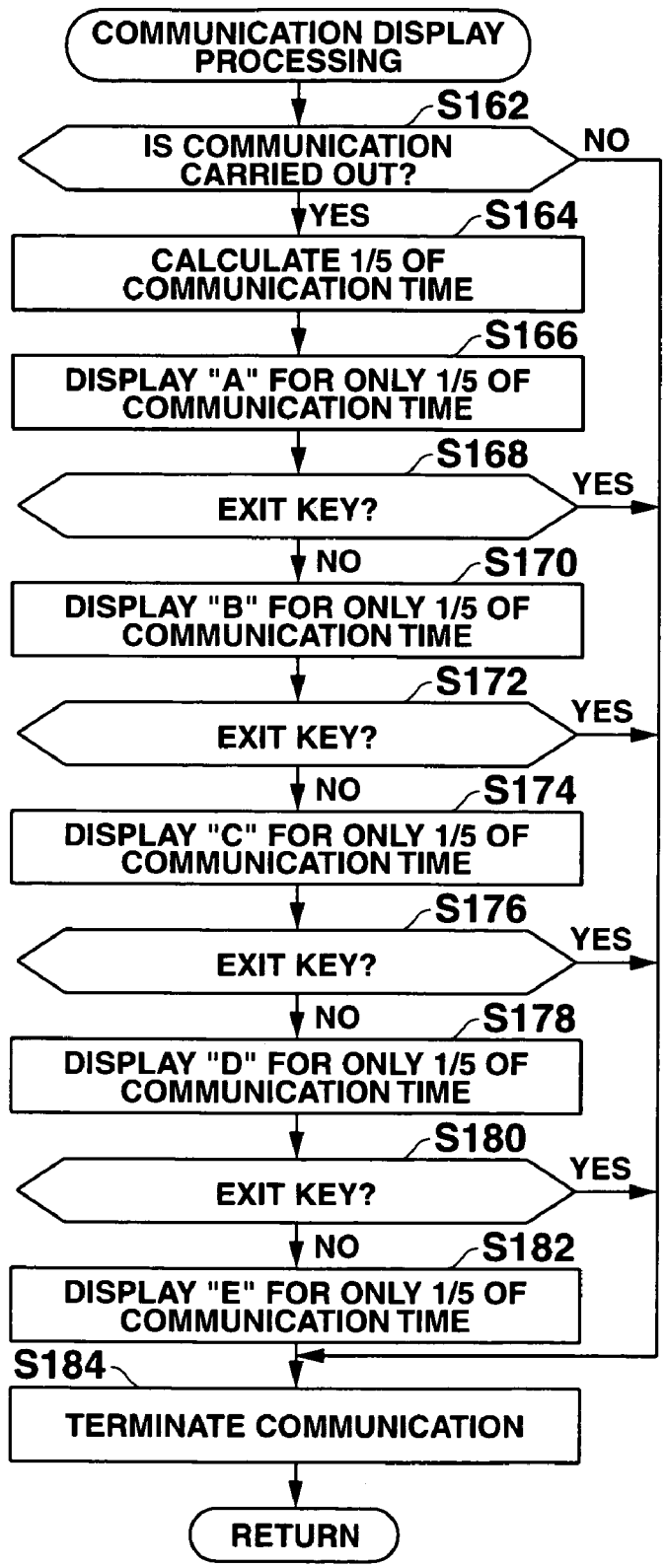
FIG. 10 is a flowchart showing communication display processing in the communication test processing.

FIG. 10 is a flowchart showing the details of the communication (transmission) display processing which is executed in step S140 of FIG. 9. Because the communication (reception) display processing executed in step S144 is the same as the processing of FIG. 10 except for the point that the transmission thereof is changed to the reception, description thereof will be omitted.

In step S162, it is determined whether or not communication is carried out. In the present embodiment, communication is carried out by connecting between the scientific electronic calculators by a code. For this reason, in step S162, it is determined on the basis of whether or not the scientific electronic calculator is connected to another scientific electronic calculator. When it is determined that communication is carried out, a predetermined communication time is divided by 5 which is a number of characters of the specific mark in step S164. This is for determining a communication/display time of 1 character because the specific mark is scroll-displayed while being transmitted one character by one character.

In step S166, the fact that the first character "A" is being transmitted is displayed for only ⅕ of the communication time. It is determined in step S168 whether or not the EXIT key 20f has been pressed. When the EXIT key 20f is pressed, the transmission is terminated in step S184, and the transmission display processing is terminated.

When the EXIT key 20f has not been pressed, the fact that the second character "B" is being transmitted is displayed for only ⅕ of the communication time in step S170. In step S172, it is determined whether or not the EXIT key 20f has been pressed. When the EXIT key 20f is pressed, the transmission is terminated in step S184, and the transmission display processing is terminated.

When the EXIT key 20f has not been pressed, the fact that the third character "C" is being transmitted is displayed for only ⅕ of the communication time in step S174. In step S176, it is determined whether or not the EXIT key 20f has been pressed. When the EXIT key 20f is pressed, the transmission is terminated in step S184, and the transmission display processing is terminated.

When the EXIT key 20f has not been pressed, the fact that the fourth character "D" is being transmitted is displayed for only ⅕ of the communication time in step S178. In step S180, it is determined whether or not the EXIT key 20f has been pressed. When the EXIT key 20f is pressed, the transmission is terminated in step S184, and the transmission display processing is terminated.

When the EXIT key 20f has not been pressed, the fact that the last character "E" is being transmitted is displayed for only ⅕ of the communication time in step S182.

Thereafter, the transmission is terminated in step S184, and the transmission display processing as well is terminated.

Figure 11:
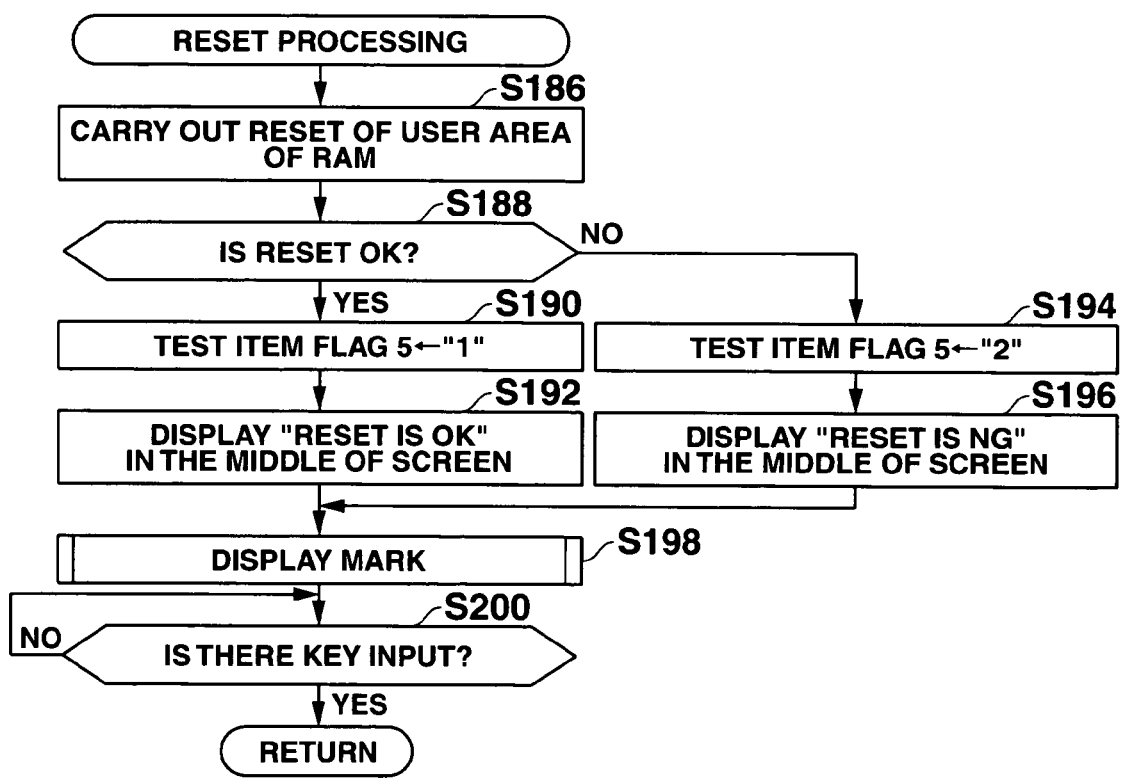
FIG. 11 is a flowchart showing reset processing in the self-diagnosis test mode processing.

FIG. 11 is a detailed flowchart of the reset processing which is executed in step S40 of FIG. 4. In step S186, the data in the user area of the RAM 18 is reset.

In step S188, it is determined whether or not a reset has been correctly carried out.

When the reset has been correctly carried out, "1" is set to the test item flag 5 in step S190, and "Reset is OK" is displayed in the middle of the screen in step S192. When the reset has not been correctly carried out, "2" is set to the test item flag 5 in step S194, and "Reset is NG" is displayed in the middle of the screen in step S196.

The mark display processing as shown in FIG. 5 is executed in step S198. When a transition is made to the self-diagnosis mode on the basis of a key input of any one of "1", "2", and "3", "ABCDE" serving as the specific mark is displayed at a position corresponding to the input key, and in a size corresponding to the input key. Although the display position of the result is fixed to the middle of the screen, the display position of the specific mark is made variable according to a transition key.

In step S200, it is determined whether or not any key is operated. When a key input is detected, the reset processing is terminated.

The entire operations based on the operations of the respective flowcharts will be described with reference to the state transition of the screen.

Figure 12:
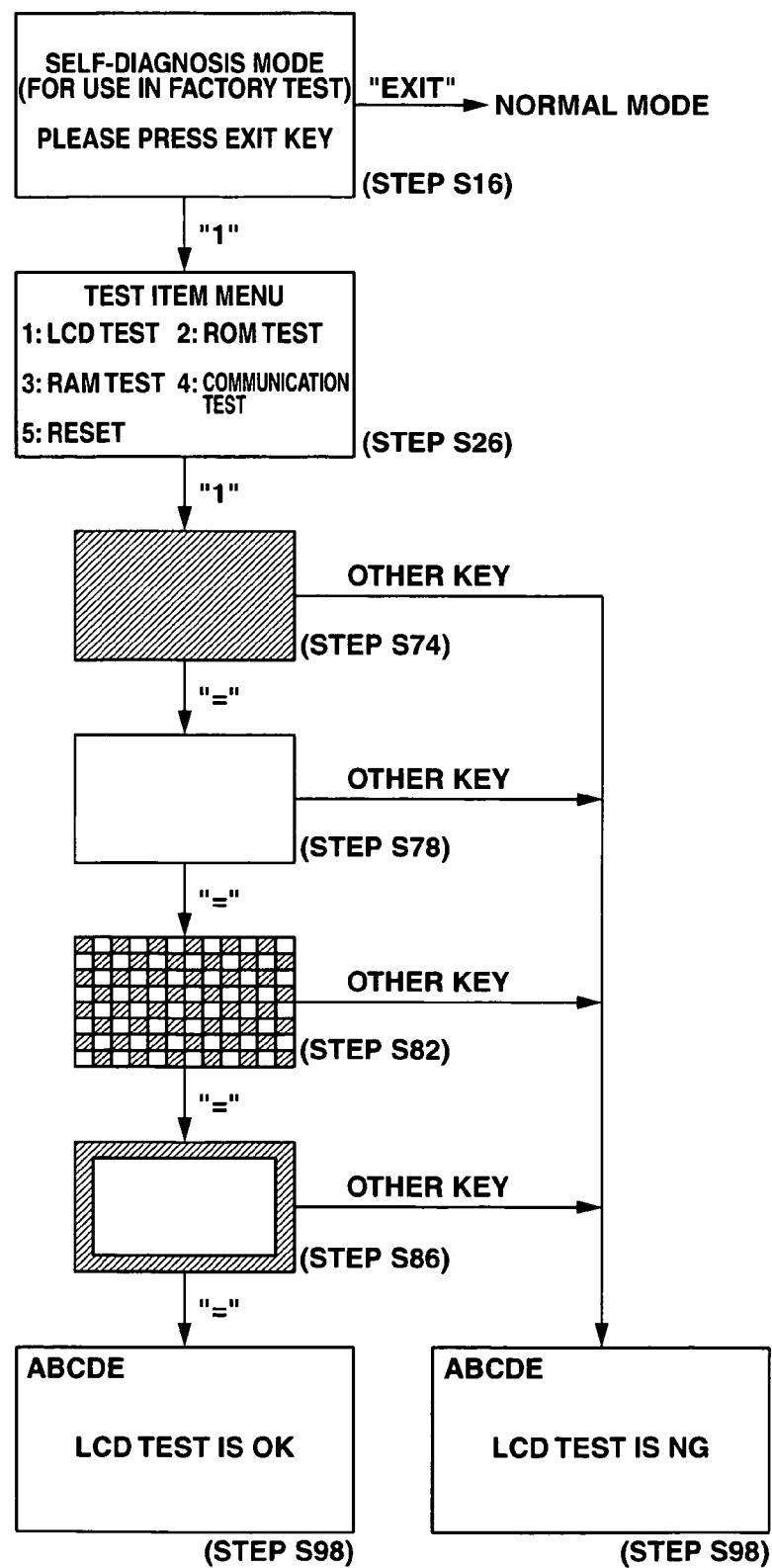
FIG. 12 is a diagram showing a screen transition of a display unit at the time of the LCD test.

FIG. 12 shows the operations of the LCD test. When it is determined in step S14 of FIG. 3 that the AC key 20a, the shift key 20d, and the menu key 20e are simultaneously pressed, guidance that is "Self-diagnosis test mode (for use in a factory test). Please press the EXIT key" is displayed. When the EXIT key 20f is pressed in step S14 as the guidance is, the processing in a normal mode is carried out, and when a predetermined test transition key is pressed, a transition is made to a test mode.

Here, suppose that a transition to a test mode is instructed by the "1" key (size: 1, display position: the upper left). A list of the test items is displayed in step S26. Here, the "1" key is pressed, and the LCD test is started.

All the pixels of the LCD are lighted in step S74 in FIG. 6. As a result of visual check by a test person, when the LCD is determined normal, the "=" key is pressed, and all the pixels of the LCD are turned off. When the LCD is determined normal, the "=" key is pressed, and the pixels of the LCD are alternately lighted so as to be staggered in step S82. When the LCD is determined normal, the "=" key is pressed, and only the peripheral pixels are lighted in a frame form in step S86. When the LCD is determined normal, the "=" key is pressed, and "LCD test is OK" is displayed in the middle of the screen in step S92, and the specific mark "ABCDE" is displayed in the same size in the upper left portion of the screen in step S98. When the LCD is determined abnormal and a key other than the "=" key is pressed in each determination, "LCD test is NG" is displayed in the middle of the screen in step S92, and the specific mark "ABCDE" is displayed in the same size in the upper left portion of the screen in step S98.

Figure 13:
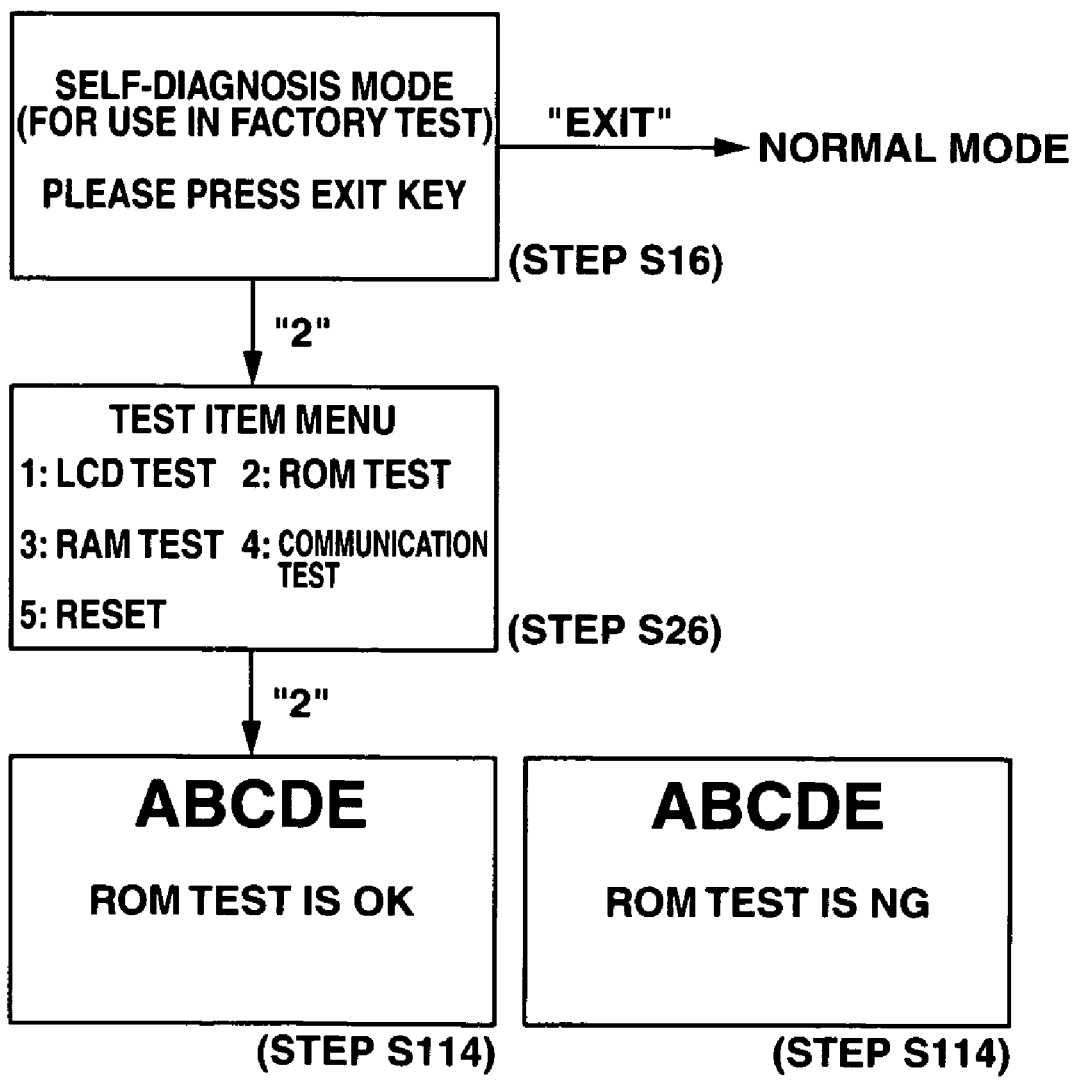
FIG. 13 is a diagram showing a screen transition of the display unit at the time of the ROM test.

FIG. 13 shows the operations of the ROM test. When it is determined in step S14 of FIG. 3 that the AC key 20a, the shift key 20d, and the menu key 20e are simultaneously pressed, guidance that is "Self-diagnosis test mode (for use in a factory test). Please press the EXIT key" is displayed in step S16. When the EXIT key 20f is pressed as the guidance is, the processing in a normal mode is carried out, and when a predetermined test transition key is pressed, a transition is made to a test mode.

Here, suppose that a transition to a test mode is instructed by the "2" key (size: 3, display position: the top center). In step S26, a list of the test items is displayed. Here, the "2" key is pressed, and the ROM test is started.

The test program checks a result of the ROM test. When the check sum is correct, "ROM test is OK" is displayed in the middle of the screen in step S108, and the specific mark "ABCDE" which is enlarged threefold is displayed in the top center of the screen in step S114. When the check sum is determined abnormal, "ROM test is NG" is displayed in the middle of the screen in step S112, and the specific mark "ABCDE" enlarged threefold is displayed in the top center of the screen in step S114.

Because the transitions of the screens of the RAM test and the reset are the same as those of the ROM test, descriptions thereof will be omitted.

FIG. 14 shows the operations of the communication test. Suppose that a transition to a test mode is instructed by the "3" key (size: 2, display position: the lower right) on the self-diagnosis test mode transition reporting screen. A list of the test items is displayed in step S26. Here, the "4" key is pressed, and a communication test is started.

In step S166 of FIG. 10, only ⅕ of the communication time is displayed as a time during a transmission of "A". Hereinafter, in the same way, the facts that "B", "C", "D", and "E" are being transmitted are displayed in steps S170, S174, S178, and S182, respectively. In step S184, the fact that the transmission has been completed is displayed.

Thereafter, a check of transmission/reception in FIG. 9 is carried out. When the result is normal, "Communication test is OK" is displayed in the middle of the screen in step S150, and the specific mark "ABCDE" enlarged double is displayed in the lower right portion of the screen in step S156. When the result is determined abnormal, "Communication test is NG" is displayed in the middle of the screen in step S154, and the specific mark "ABCDE" enlarged double is displayed in the lower right portion of the screen in step S156.

As described above, according to the first embodiment, an information processing apparatus having a self-diagnosis test function with high visibility of display of a result of a self-diagnosis test, a self-diagnosis method, and a program can be provided in such a manner that a result of a self-diagnosis test is displayed at a predetermined position on a display screen, and that a specific mark is displayed in a mode corresponding to any one first input key signal among first key signals for setting an operation mode to a test mode.

The operation mode is set to a test mode in accordance with a first key signal, a self-diagnosis test is executed, the test result is displayed at a predetermined position, and a specific mark is displayed in a mode corresponding to the first key signal.

Consequently, the result of the self-diagnosis test is displayed along with a predetermined mark, and therefore, the visibility of the test result is improved.

With respect to test mode setting, a test mode transition reporting screen is displayed based on at least two key signals, a transition is made to a test mode is in accordance with a first key signal input during the time of displaying the test mode transition reporting screen, and a test item selection screen is displayed. With respect to an execution of a test, a self-diagnosis test of an item corresponding to a second key signal input during the time of displaying the test item selection screen is executed.

Accordingly, a plurality of self-diagnosis tests can be selectively executed.

Test mode transition reporting screen displaying means displays a message for urging a user to input a third key signal other than the first key signal. When the third key signal is input, a normal mode is set.

As a consequence, when a start of a self-diagnosis test mode is instructed in error, the instruction can be cancelled.

The specific mark is displayed at a position and in a size which correspond to the first key signal.

Because a size and a position of the specific mark to be displayed can be selected, the visibility of test results can be changed depending on the situation.

A memory in which data denoting a size and a display position corresponding to the first key signal is further provided, and the specific mark is displayed in a size corresponding to the first key signal at a position corresponding to the first key signal with respect to the memory.

Because a size and a display position of the specific mark to be displayed can be selected, the visibility of test results can be changed depending on the situation.

The operation mode can be set to a test mode in accordance with a fourth key signal for making the specific mark be not displayed.

Therefore, a display of only test results can be selected, and the convenience can be improved.

A test for a communication function as well is included in the test items, and the specific mark is displayed also during a communication test. The specific mark is composed of a plurality of characters, and the plurality of characters are scroll-displayed one character by one character.

Because the specific mark is displayed in a mode according to the progress of the test also during the test, an execution of the self-diagnosis test can be confirmed.

When there are a plurality of test items, it is displayed whether or not the test results of all the items are normal.

Consequently, the result of a self-diagnosis test can be confirmed at one view.

While the description above refers to the particular embodiment of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, it has been described that the self-diagnosis test mode is started during the time the power source is off by simultaneously pressing the AC key 20a and at least two specific keys; the shift key 20d and the menu key 20e in the embodiment during the time the power source is off. However, the self-diagnosis test mode may be started by simultaneously pressing at least two specific keys; the shift key 20d and the menu key 20e during the time the power source is on, and may be started by, not simultaneously pressing, but pressing the specific keys in order. Further, in only a communication test, the specific mark is displayed during the test. However, the specific mark may be displayed during the tests in other tests as well. Moreover, the specific mark is described as a predetermined mark by using a plurality of characters. However, the specific mark may be a logo in the motif of characters, or a predetermined character picture, and additionally, may be displayed as not only a still image but also an animation.

The above description has been made by using the scientific electronic calculator serving as an information processing apparatus as an example. However, the information processing apparatus is not limited to a scientific electronic calculator, and may be applied to, for example, an electronic calculator which mainly handles arithmetic operations, and a financial calculation electronic calculator having a built-in financial calculation function. Moreover, the present invention is not limited to an electronic calculator, and may be applied to electronics devices in general, such as a portable telephone handset, a personal computer, an electronic clock, and a personal digital assistance. Specifically, the present invention can be applied any of electronics devices which can execute various data/programs of the ROM 16 shown in FIG. 2.

In addition, the present invention can be implemented as a computer-readable recording medium having stored therein a program for causing a computer to execute predetermined means, or for causing a computer to function as predetermined means, or for causing a computer to achieve a predetermined function.

What is claimed is:

1. A self-diagnosis method for an information processing apparatus having a self-diagnosis test function, the method comprising:
    setting an operation mode to a test mode in response to one of first input key signals;
    executing a self-diagnosis test in the set test mode; and
    displaying a result of the executed self-diagnosis test at a predetermined position on a display screen, and displaying a specific mark at a position and in a size which corresponds to said one of the first input key signals.

2. The method according to claim 1, wherein:
    the setting of the test mode comprises displaying a test selection screen on the display screen when the test mode is set in response to the one of the first key signals in a state in which a test mode transition reporting screen is displayed on the display screen in response to at least two input key signals, and
    the executing of the self-diagnosis test comprises executing a self-diagnosis test of an item corresponding to one of second input key signals which is input while the test selection screen is displayed.

3. The method according to claim 2, wherein the test selection screen comprises a message urging a user to input a third key signal other than the first key signals, and wherein when the third key signal is input, a normal mode for carrying out calculation functions is set.

4. The method according to claim 2, wherein the displaying of the result of the executed self-diagnosis test comprises, when all self-diagnosis tests are executed, displaying whether or not all results are normal at the predetermined position on the display screen, and displaying the specific mark in a mode corresponding to said one of the first input key signals.

5. The method according to claim 1, wherein the setting of the test mode comprises setting the operation mode to the test mode in response to a fourth key signal for causing the specific mark not to be displayed.

6. The method according to claim 1, wherein the executing of the self-diagnosis test comprises:
    carrying out a communication test for a communication function; and
    displaying the specific mark on the display screen during the communication test.

7. The method according to claim 6, wherein the displaying of the specific mark comprises scroll displaying characters configuring the specific mark one character by one character during the communication test.

8. A computer readable medium having a computer program that is executable by an information processing apparatus having a self-diagnosis test function to control the information processing apparatus to perform functions comprising:
- setting an operation mode to a test mode in response to any first input key signal;
- executing a self-diagnosis test in the test mode;
- displaying a result of the self-diagnosis test at a predetermined position on a display screen; and
- displaying a specific mark at a position and in a size which corresponds to said any first input key signal.

9. An information processing apparatus having a self-diagnosis test function, the information processing apparatus comprising:
- test mode setting means for setting an operation mode to a test mode in response to one of first input key signals;
- test executing means for executing a self-diagnosis test in the test mode set by the test mode setting means; and
- result display means for displaying a result of the self-diagnosis test executed by the test executing means at a predetermined position on a display screen, and for displaying a specific mark at a position and in a size which corresponds to said one of the first input key signals.

10. The apparatus according to claim 9, wherein
- the test mode setting means comprises selection screen display means for displaying a test selection screen on the display screen when the test mode is set in response to the one of the first key signals in a state in which a test mode transition reporting screen is displayed on the display screen in response to at least two input key signals, and
- the test executing means comprises test item executing means for executing a self-diagnosis test of an item corresponding to one of second input key signals which is input during a display of the test selection screen by the selection screen display means.

11. The apparatus according to claim 10, wherein the selection screen display means displays a message for urging a user to input a third key signal other than the first key signals, and when the third key signal is input, a normal mode for carrying out calculation functions is set.

12. The apparatus according to claim 10, wherein the result display means includes an all-results display means for, when executing all self-diagnosis tests by the test executing means, displaying whether or not all results are normal at the predetermined position on the display screen, and displaying the specific mark in a mode corresponding to said one of the first input key signals.

13. The apparatus according to claim 9, further comprising a memory which stores data denoting a size and a display position which correspond to the one of the first key signals, wherein the result display means displays a specific mark at a position and in a size which correspond to the first key signal with reference to the memory.

14. The apparatus according to claim 9, wherein the test mode setting means further sets the operation mode to the test mode in response to a fourth key signal for making the specific mark be not displayed.

15. The apparatus according to claim 9, wherein the test executing means comprises:
- communication test executing means for carrying out a test for a communication function; and
- during-communication display means for displaying the specific mark on the display screen during the communication test by the communication test executing means.

16. The apparatus according to claim 15, wherein the during-communication display means scroll-displays characters configuring the specific mark one character by one character during the communication test.

* * * * *